(12) United States Patent
Tamura et al.

(10) Patent No.: US 9,741,979 B2
(45) Date of Patent: Aug. 22, 2017

(54) BATTERY PACK

(71) Applicant: NEC ENERGY DEVICES, LTD., Sagamihara-shi, Kanagawa (JP)

(72) Inventors: Hiroaki Tamura, Sagamihara (JP); Kazunori Maruoka, Sagamihara (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 97 days.

(21) Appl. No.: 14/408,325

(22) PCT Filed: Jun. 24, 2013

(86) PCT No.: PCT/JP2013/067256
§ 371 (c)(1),
(2) Date: Dec. 16, 2014

(87) PCT Pub. No.: WO2014/002950
PCT Pub. Date: Jan. 3, 2014

(65) Prior Publication Data
US 2015/0147638 A1    May 28, 2015

(30) Foreign Application Priority Data

Jun. 25, 2012 (JP) ................................. 2012-142434
Jun. 29, 2012 (JP) ................................. 2012-147029

(51) Int. Cl.
*H01M 2/08* (2006.01)
*H01M 2/02* (2006.01)
(Continued)

(52) U.S. Cl.
CPC ........... *H01M 2/08* (2013.01); *H01M 2/0277* (2013.01); *H01M 2/1077* (2013.01);
(Continued)

(58) Field of Classification Search
None
See application file for complete search history.

(56) References Cited

U.S. PATENT DOCUMENTS

2009/0053585 A1    2/2009   Nakazawa
2009/0291354 A1   11/2009   Inagaki et al.

FOREIGN PATENT DOCUMENTS

CN    1862870 A    11/2006
CN  101467282 A     6/2009
(Continued)

OTHER PUBLICATIONS

English translation of JP 2010-219268 obtained from the JPO website Jun. 23, 2016.*
(Continued)

*Primary Examiner* — Sarah A Slifka
(74) *Attorney, Agent, or Firm* — Sughrue Mion, PLLC (57) ABSTRACT

To provide a battery pack less subject to vibration, shock, or the like and stable in characteristics.
A battery pack includes a unit battery obtained by accommodating, in a casing film, a battery element in which positive and negative electrodes are stacked via separators, the unit battery having a sealing portion obtained by sealing opposing synthetic resin layers formed on inner surface of the casing film; and a lithium ion secondary battery stacked body obtained by stacking a plurality of the unit batteries and winding a fixing tape therearound. A sealing surface of the sealing portion is substantially parallel to a unit battery stacking surface, and an end surface of the sealing portion is brought into contact with the fixing tape.

2 Claims, 5 Drawing Sheets (51) Int. Cl.
   *H01M 2/10* (2006.01)
   *H01M 10/052* (2010.01)
   *H01M 10/0585* (2010.01)

(52) U.S. Cl.
   CPC ..... *H01M 10/052* (2013.01); *H01M 10/0585* (2013.01); *Y02T 10/7011* (2013.01)

(56) References Cited

FOREIGN PATENT DOCUMENTS

| JP | 2002100411 A | 4/2002 |
| JP | 2003-323874 A | 11/2003 |
| JP | 2004-047161 A | 2/2004 |
| JP | 2006-318797 A | 11/2006 |
| JP | 2009-163932 A | 7/2009 |
| JP | 2010-219268 A | 9/2010 |
| JP | 2013-004260 A | 1/2013 |
| WO | 2007/043392 A1 | 4/2007 |

OTHER PUBLICATIONS

English translation of JP 2006-318797 obtained from the JPO website Jun. 23, 2016.*
International Search Report of PCT/JP2013/067256 dated Aug. 20, 2013 [PCT/ISA/210].
Communication dated Mar. 4, 2016 from the State Intellectual Property Office of the P.R.C. in counterpart application No. 201380033597.3.
Communication dated Mar. 15, 2017, from the Japanese Patent Office in counterpart Japanese application No. 2014-522615.
Communication dated Jun. 7, 2017 from the Japanese Patent Office in counterpart application No. 2014-522615.

* cited by examiner

Fig.5B

BATTERY PACK

CROSS REFERENCE TO RELATED APPLICATIONS

This application is a National Stage of International Application No. PCT/JP2013/067256, filed Jun. 24, 2013, claiming priority from Japanese Patent Application Nos. 2012-142434, filed Jun. 25, 2012 and 2012-147029, filed Jun. 29, 2012, the contents of all of which are incorporated herein by reference in their entirety.

TECHNICAL FIELD

The present invention relates to a battery pack including a plurality of connected secondary batteries. A battery pack using stacked secondary battery (lithium ion battery, etc.) in which a plurality of positive and negative electrodes are stacked via separators is capable of easily increasing a unit cell capacity by increasing areas of the positive and negative electrodes or by increasing the number of positive and negative electrodes to be stacked and is thus preferably used as a battery having a large charge and discharge capacity.

BACKGROUND ART

The secondary batteries are used in various uses and, among them, a lithium ion secondary battery, in which charge and discharge take place as lithium ions move between positive and negative electrodes, is preferably used as a battery for moving vehicles such as an automobile, an electric motorcycle, an electric bicycle because it has the following battery characteristics: high mass energy density and high volume energy density.

The lithium ion battery used for a drive power source or an auxiliary drive power for an automobile, an electric motorcycle, an electric bicycle, and the like mainly includes a type obtained by accommodating a columnar body around which positive and negative electrodes are stacked and wound via separators in a metal casing and a type obtained by accommodating a flat body in which positive and negative electrodes are stacked via separators in a package.

Among the above lithium ion secondary batteries, the flat lithium ion secondary battery is preferably used as a battery for a power source for motor drive or the like because it is capable of easily increasing a unit cell capacity by increasing areas of the positive and negative electrodes or by increasing the number of positive and negative electrodes to be stacked.

As for a unit battery of the flat lithium ion secondary battery, it is possible to make effective use of high energy density that the lithium ion secondary battery has by packaging battery elements with a film material.

It has been proposed a configuration in which a plurality of film-casing batteries (unit batteries) which are conductively connected to each other and stacked via heat insulating and cushioning sheet members are secured by a tape as a binding member in order to prevent displacement between the unit batteries due to vibration in transportation (refer to, e.g., Patent Document 1).

CITATION LIST

Patent Document

[Patent Document 1] JP2009-163932A

DISCLOSURE OF THE INVENTION

Problems to be Solved by the Invention

A battery pack used as a power source for devices, such as an electric automobile and an electric bicycle, in which vibration is generated during operation, is required to be resistant to the vibration.

Even though the fixation of the unit batteries can be achieved by securing a stacked body of the unit batteries mounted on a base plate of a larger size than a size of the unit battery by winding the tape around the stacked body, the configuration disclosed in Patent Document 1 has the following problem.

That is, the tape is obliquely-wound from the base plate of a larger size than the size of the unit battery to the unit batteries, so that a sealing portion of the unit battery is deformed, which may degrade insulation resistance of the sealing portion or may generate liquid leakage in long-term use.

An object of the present invention is to provide a battery pack using the film-casing battery capable of preventing sealing failure in the film-casing battery due to vibration and shock and capable of operating in a stable manner for a long period of time.

Means for Solving the Problems

To solve the above problem, there is provided a battery pack including a unit battery obtained by accommodating, in a casing film, a battery element in which positive and negative electrodes are stacked via separators, the unit battery having a sealing portion obtained by sealing opposing synthetic resin layers formed on inner surface of the casing film and a lithium ion secondary battery stacked body obtained by stacking a plurality of the unit batteries and winding a fixing tape therearound, wherein a sealing surface of the sealing portion is substantially parallel to a unit battery stacking surface, and an end surface of the sealing portion is brought into contact with the fixing tape.

In the battery pack according to the present invention, a reinforcing member is further disposed on an outermost layer of the battery stacked body and fixed to the battery stacked body, together with the unit batteries by the fixing tape.

Note that, in the present invention, the sealing surface refers to a surface formed between members on both surfaces of the sealing portion and parallel to the members on both surface of the sealing portion.

Further, the term "substantially parallel" includes a completely parallel state as well as a substantially, but not precisely parallel state in which a desired effect can be substantially obtained. Specifically, the term "substantially parallel" includes a completely parallel state and a case where two objects are shifted from each other by 0° to 10° from a completely parallel state.

Advantages of the Invention

According to the battery pack of the present invention, the battery stacked body is produced with the heat sealing portion of the film-casing material by which a lithium ion secondary battery excellent in energy efficiency is covered, at which the inside of the film-casing material is hermetically sealed made parallel to the unit battery stacking surface, and the sealing characteristics can be maintained for a long period of time. Thus, it is possible to prevent degradation of insulation resistance and leakage of electrolyte or the like and to increase workability at the assembly work of the battery pack to thereby efficiently produce the battery pack.

BRIEF DESCRIPTION OF THE DRAWINGS

FIG. 3 is a perspective view for explaining a battery stacked body constituting the battery pack according to the embodiment of the present invention, in which

BEST MODE FOR CARRYING OUT THE INVENTION

An embodiment of the present invention will be described below with reference to the drawings.

Figure 1:
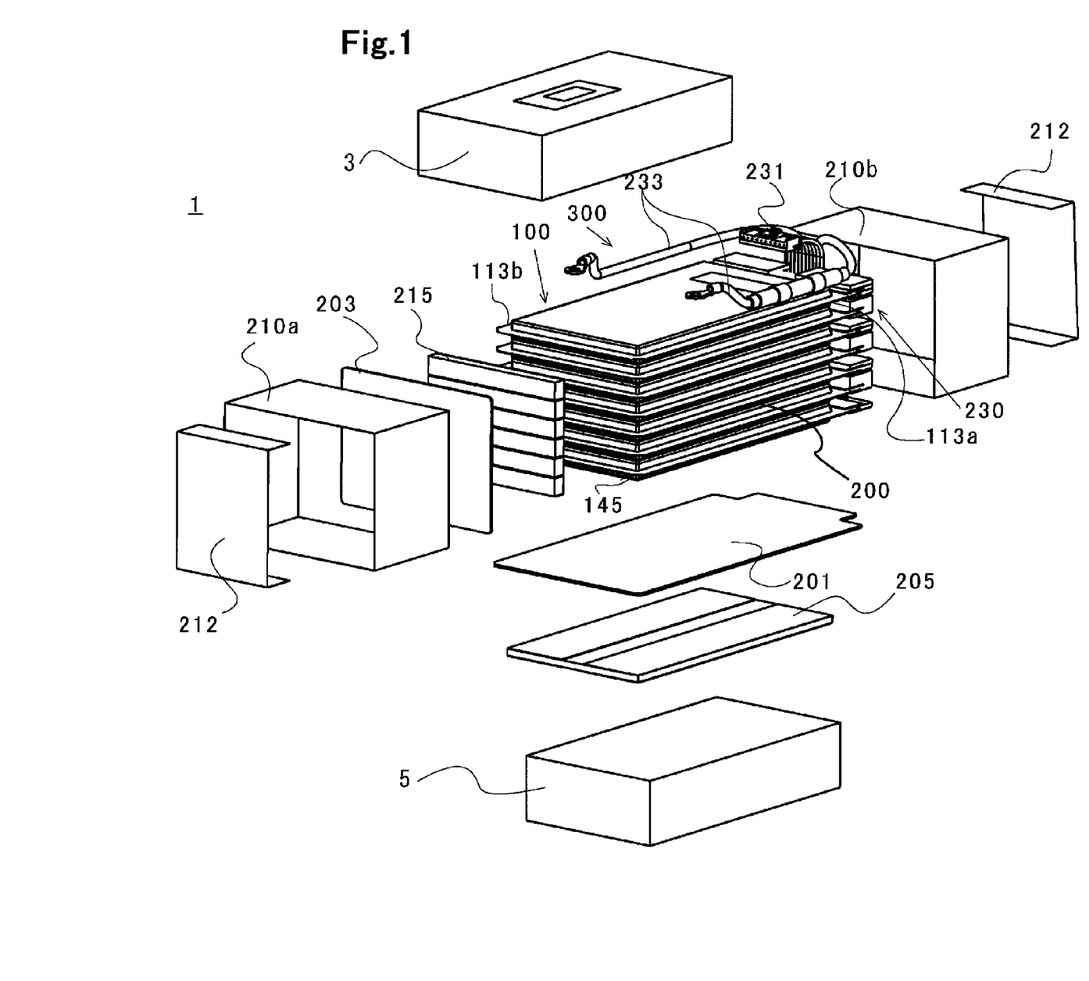
FIG. 1 is an exploded perspective view for explaining an example of a battery pack according to an embodiment of the present invention.

FIG. 1 is an exploded perspective view for explaining a battery pack according to an embodiment of the present invention.

A battery pack 1 of the present embodiment has casings 3 and 5 and a battery connecting structure 300 thereinside.

The battery connecting structure 300 is joined to a first reinforcing member 201 having the same width as a width between side end portions 113a and 113b of a unit battery 100 by fixing tapes 210a and 210b.

The battery connecting structure 300 is connected, at an electrode terminal portion 230 side thereof, through an electrode terminal of each unit battery 100, to a signal line 231 provided for confirmation of a state of a battery stacked body 200 and to a lead wire 233 for connecting the battery stacked body to a protection circuit board. The battery stacked body 200 integrated with the first reinforcing member 201 has a cushioning member 205 connected to an outer surface thereof.

A lower end sealing portion 145 of the unit battery 100, which is an end portion at a side opposite to the electrode terminal portion 230 of the battery stacked body 200, is mounted with a stacked body movement suppressing member 215, and an outer surface of the stacked body movement suppressing member 215 is connected with a second reinforcing member 203.

Mounting of the stacked body movement suppressing member 215 allows a further increase in anti-vibration and anti-shock strength of the end portion at the side opposite to the electrode terminal portion 230 of the battery stacked body 200 which is retained by connection to circuit connection components. The stacked body movement suppressing member 215 is fixed to both end surfaces of the electrode terminal portion 230 side of the battery stacked body 200 and the second reinforcing member 203 side by end surface fixing tapes 212.

The battery stacked body 200 is thus integrated with the first reinforcing member 201, second reinforcing member 203, and the like, and is then subjected to predetermined wire connection, and the resultant battery stacked body 200 is accommodated in casings 3 and 5, whereby the battery pack 1 is obtained.

Figure 2:
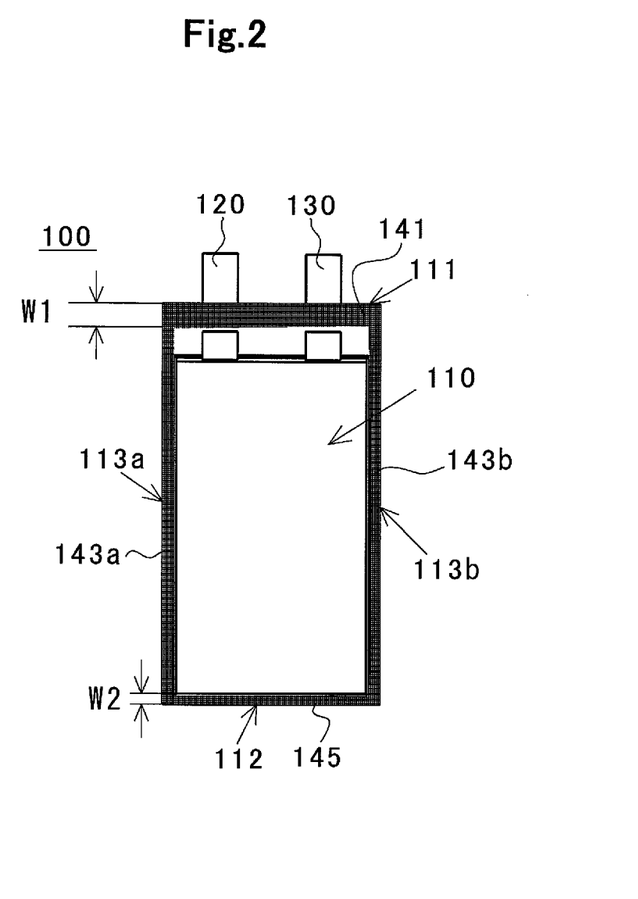
FIG. 2 is a view for explaining an example of a unit battery used to constitute the battery pack according to the embodiment of the present invention.

FIG. 2 is a view illustrating the unit battery 100 constituting the battery pack according to the embodiment of the present invention. The unit battery 100 is a lithium ion secondary battery. A unit battery main body 110 of the unit battery 100 has a structure in which a stacked electrode body (not illustrated) obtained by stacked a plurality of flat plate-like positive electrodes and a plurality of flat plate-like negative electrodes via separators and electrolyte (not illustrated) are accommodated in a film-casing material having a rectangular shape in a plan view. A positive electrode lead-out tab 120 and a negative electrode lead-out tab 130 are led out from an upper end portion 111 of the unit battery main body 110.

The positive electrode lead-out tab 120 and negative electrode lead-out tab 130 are each formed into a flat shape. In the film-casing material, the positive electrode lead-out tab 120 and negative electrode lead-out tab 130 are connected to a positive electrode collector and a negative electrode collector, respectively, in a direct manner or via a lead body 11. The film-casing material includes a heat-sealable resin layer on a plane facing an inside of the battery and a protective film on a plane facing an outside of the battery, the heat-sealable resin layer and protective film being stacked on a metal foil such as an aluminum foil.

More specifically, on a plane that is positioned on the outer-surface side of the aluminum foil, a member that has strength and heat resistance, such as nylon or polyethylene terephthalate, is stacked; on the inner-surface side, a material that is excellent in heat sealability, such as polypropylene or polyethylene, is stacked.

With a battery element and the electrolyte stored in the film-casing material, a periphery thereof, i.e., the upper end portion 111, a lower end portion 112, and two side end portions 113a and 113b, is heat-sealed. As a result, an upper end heat sealing portion 141, two side end heat sealing portions 143a, 143b, and a lower end heat sealing portion 145 are formed respectively at the upper end portion, side end portions, and lower end portion, whereby an inside of the film-casing material is hermetically sealed.

A sealing width of each sealing portion, i.e., a minimum length from the end portion of the sealing portion at the battery element side to end surface of the sealing portion at the unit battery outer periphery has two or more different widths. A sealing width W1 of the upper end heat sealing portion 141 is largest, and a sealing width W2 of the lower end heat sealing portion 145 is smaller than the sealing width W1. By thus changing the sealing width at the outer periphery of the unit battery, it is possible to reduce an outer diameter of the unit battery 100 while ensuring strength of the sealing part of an electrode lead-out portion requiring the highest strength for securing safety in an unexpected failure.

In the above unit battery 100, aluminum or aluminum alloy can be used as a material of the positive electrode lead-out tab 120; nickel, nickel-plated copper, or nickel-copper clad can be used as a material of the negative electrode lead-out tab 130. In the present embodiment, the positive electrode lead-out tab 120 made of aluminum and the negative electrode lead-out tab 130 made of nickel are used.

In order to make the battery pack according the present invention, a positive lead-out tab of a first unit battery 100 and a negative lead-out tab of a second unit battery 100, which is adjacent to the first unit battery 100, are joined by resistance sealing or the like and thereby connected together electrically.

Figure 3A:
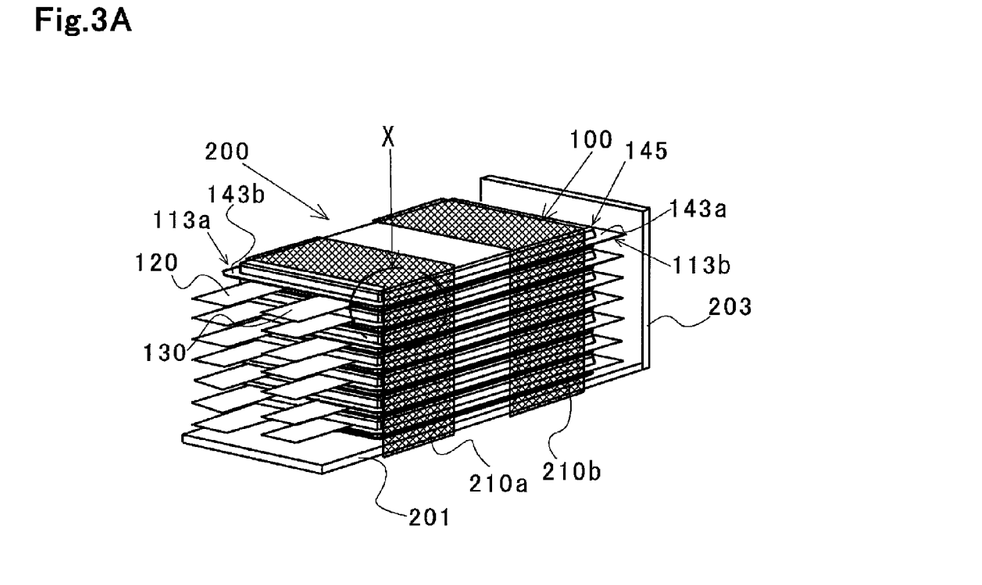
FIG. 3A is a perspective view for explaining the battery stacked body mounted with a reinforcing member and FIG. 3B is a partial cross-sectional view obtained by cutting the battery stacked body at a portion X along a plane perpendicular to the stacking surface.
Figure 3B:
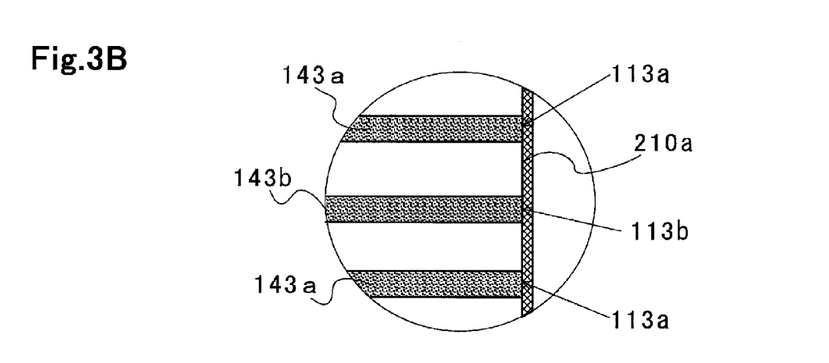

The following describes the battery stacked body 200 used to constitute the battery pack according to the embodiment of the present invention with reference to FIGS. 3A and 3B. FIG. 3A is a perspective view, and FIG. 3B is a partial cross-sectional view obtained by cutting the battery stacked body 200 at a portion X along a plane perpendicular to the stacking surface.

The battery stacked body 200 is obtained by sequentially stacking a desired number of unit batteries 100 on the first reinforcing member 201 and second reinforcing member 203 crossing the first reinforcing member 201 at right angles such that the positive electrode lead-out tab 120 and negative electrode lead-out tab 130 of the vertically-arranged unit batteries have reverse polarities mutually. The unit batteries 100 can be mutually fixed to each other by a two-sided adhesive tape attached to a stacking surface thereof.

The respective unit batteries 100 are placed on the first reinforcing member 201 having substantially the same width as a width between the side end portions 113a and 113b crossing, at right angles, a width direction of the unit battery, i.e., a side from which the positive electrode lead-out tab 120 and negative electrode lead-out tab 130 with the heat sealing portions 141, 143a, 143b, and 145 not being folded but maintained parallel to the stacking surface of the battery stacked body 200 for the unit battery 100.

The term "substantially the same width" refers to a width exhibiting the same effect as that obtained in a case where the first reinforcing member 201 has the same width as the width between the side end portions 113a and 113b. Specifically, the "substantially the same width" means a width in a range of ±2% of the width between the side end portions of the unit battery.

The battery stacked body 200 is fixed to the first reinforcing member 201 by the two fixing tapes 210a and 210b wound respectively on different portions. Although the two fixing tapes are wound with a space therebetween, three or more fixing tapes may be wounded with a space therebetween. Winding the fixing tapes with a space therebetween allows heat generated from the unit battery to be satisfactorily radiated.

Further, in the battery pack according to the present invention, the first reinforcing member 201 serving as a bottom surface of the battery pack and the side end portion of the unit battery 100 are made equal in width. The heat sealing portions 143a and 143b are stacked in substantially parallel to the stacking surface of the battery stacked body 200 as illustrated in FIG. 3B, so that the end surfaces 113a and 113b of the respective heat sealing portions contact, at right angles, the surfaces of the fixing tapes 210a and 210b extending toward the unit battery side perpendicularly to the surface of the first reinforcing member 201.

Further, although, in FIGS. 1 and 3, a reinforcing member having the same dimension as that of the first reinforcing member 201 having the same width as a width between the side end portions 113a and 113b is not placed on an uppermost surface of the battery stacked body 200, it is preferable to place a reinforcing member (not illustrated) having the same dimension as that of the first reinforcing member 201 having the same width as the width between the side end portions 113a and 113b on the uppermost surface of the battery stacked body 200.

However, as illustrated in FIGS. 1 and 3, even in a case where only the first reinforcing member 201 is disposed at the bottom portion, it is possible to obtain substantially the same effect as in a case where the same reinforcing member is disposed also on the uppermost surface, thereby achieving reduction both in size and weight.

That is, when a member having the same width as that between the side end portions 113a and 113b of the unit battery is disposed as the first reinforcing member 201 to be disposed at the lower portion of the battery stacked body 200; a plurality of unit batteries 100 are stacked; and the fixing tapes 210a and 210b are wound around the unit batteries 100 from the first reinforcing member 201, the fixing tapes are wound upward so as to be brought into contact with the side end portions 143a and 143b. As a result, the fixing tapes extend while being sequentially brought into contact with the end portions of the unit batteries of the lower layer, so that even when the fixing tapes are folded from the side end portion of the uppermost unit battery 100 toward the battery main body having a height slightly greater than the height of the side end portion by a half thickness of the unit battery after being brought into the side end portion of the uppermost unit battery 100, the heat sealing portion of each unit battery is not deformed significantly, and the heat sealing portion can be maintained in substantially parallel to the stacking surface for the unit battery.

In the present invention, the reinforcing member may be made of a metal material, such as aluminum or aluminum alloy, synthetic resin, such as ABS resin, polyethylene terephthalate resin or polycarbonate resin, or a metallic member and a member made of synthetic resin with dispersed, highly heat-conductive material particles.

In the case of aluminum, aluminum alloy or the like, an alumite treatment film or insulating film is preferably formed on a surface. The above film prevents troubles from occurring even when a voltage applying section comes in contact with the protective member.

Further, the reinforcing member may be made of not only a solid plate-like member but also various members such as a lattice-like member and a hollow member.

The fixing tape may be a synthetic resin film, having high strength, such as nylon, polyethylene terephthalate, polypropylene, on one side of which an adhesive material is applied.

Figure 4:
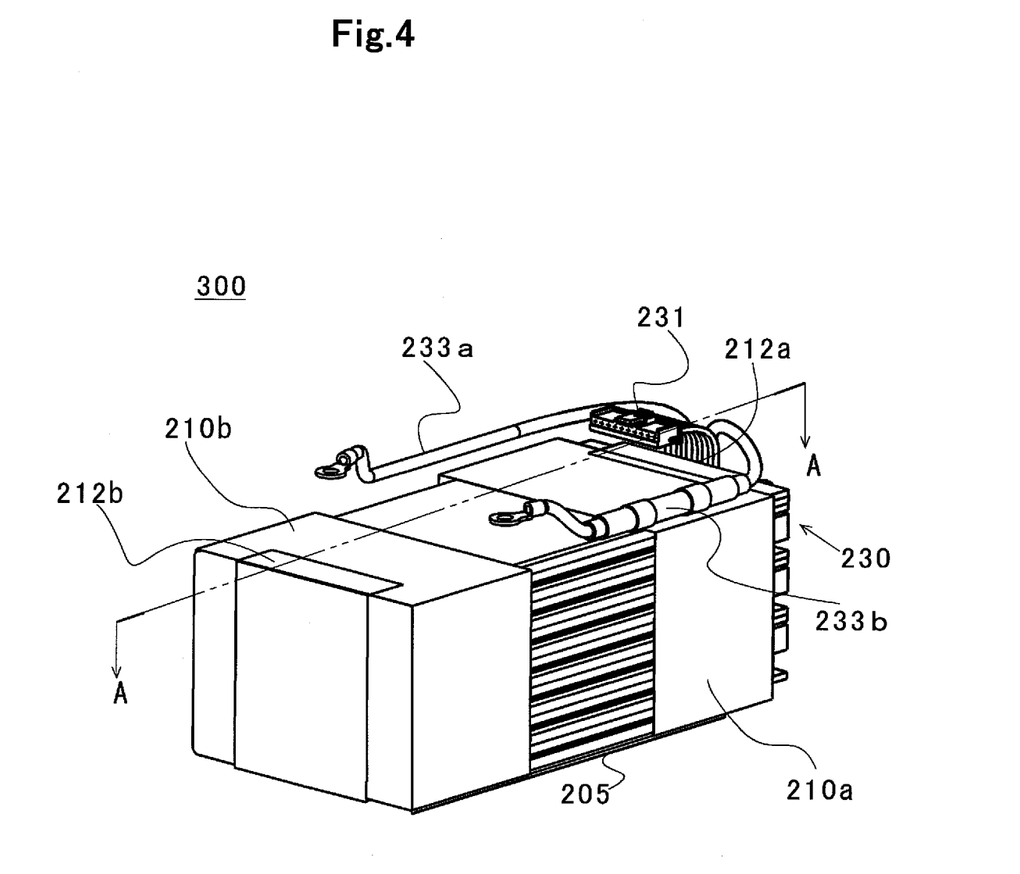
FIG. 4 is a perspective view for explaining a battery connecting structure to be accommodated in the battery pack according to the present invention.

FIG. 4 is a perspective view for explaining a battery connecting structure to be accommodated in the battery pack according to the present invention.

At the electrode terminal portion 230 side of the battery connecting structure 300 including the integrated battery stacked body, the electrode terminal of each unit battery 100 is connected to the signal line 231 and lead wires 233a and 233b for connecting the battery to the protection circuit board. Preferably, a moisture/water-proof film is formed on the entire area of the protection circuit board, excluding at least elements having a large heat value, such as a power-control semiconductor.

Further, at the electrode terminal portion 230 side of the battery connecting structure 300, a protective tape 212a is stuck to the fixing tape 210 for integrating the battery stacked body with the first reinforcing member 201. Further, at the bottom surface 205 side positioned at a side opposite to the electrode terminal portion 230 side of the battery connecting structure 300, a protective tape 212b is stuck to the fixing tape 210b to thereby cover the bottom surface.

As described above, in the battery pack according to the present invention, the battery connecting structure 300 is covered by the protective tapes 212a and 212b, thereby allowing each unit battery to be reliably fixed and protected.

Figure 5A:
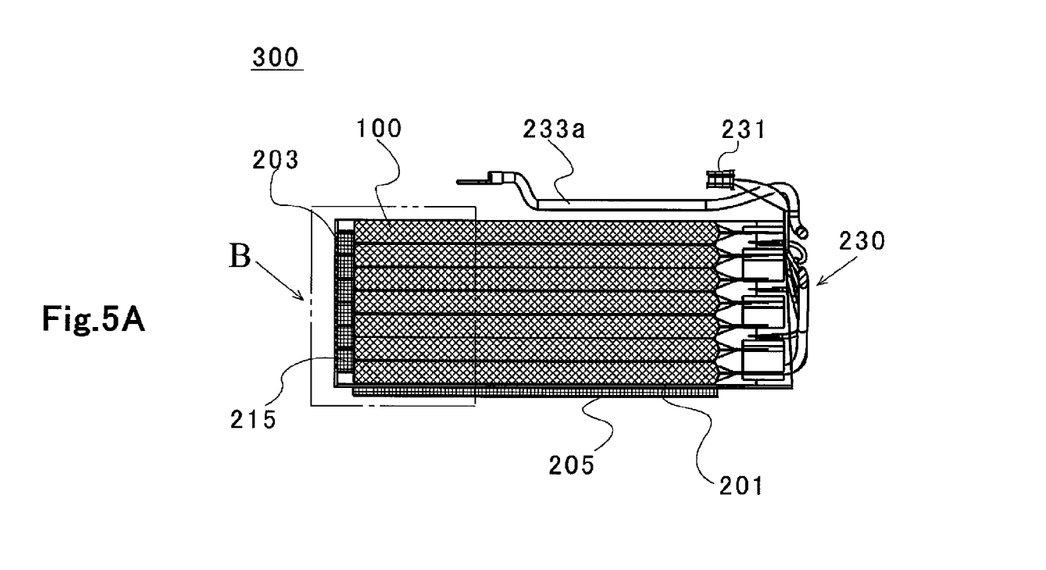
FIGS. 5A and 5B are each a cross-sectional view of the battery pack according to the embodiment of the present invention, the cross-sectional view being obtained by cutting the battery pack along a plane perpendicular to a middle point of a short side in FIG. 4.
Figure 5B:
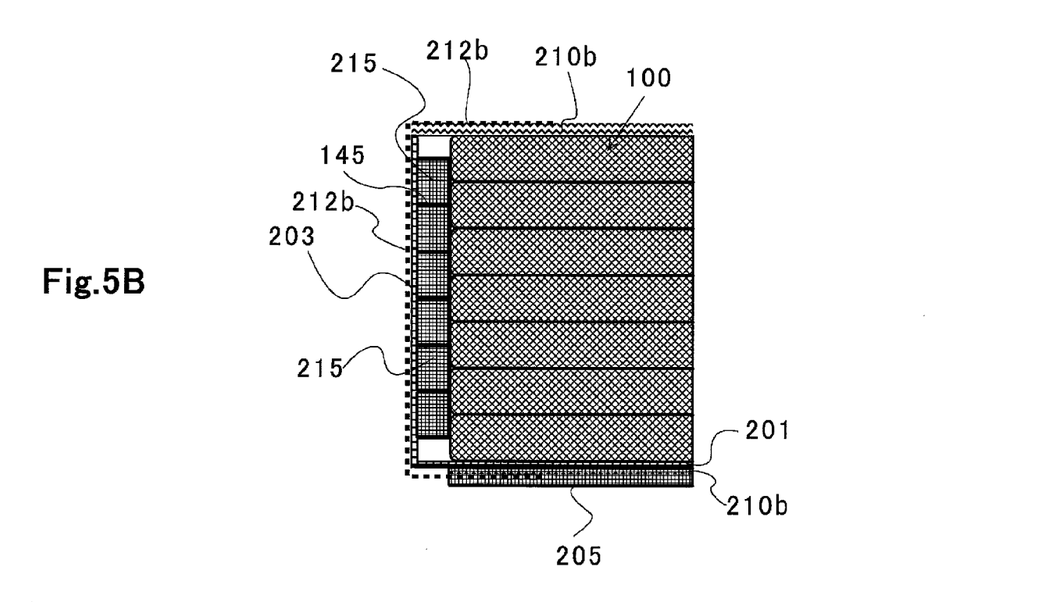

FIGS. 5A and 5B are each a cross-sectional view of the battery connecting structure taken along a cutting line A-A of FIG. 4, in which FIG. 5A is a cross sectional view of the entire battery connecting structure, and FIG. 5B is across-sectional view obtained by enlarging a portion B in FIG. 5A.

In the battery connecting structure 300 of the battery pack according to the present invention, a stacked body movement suppressing member 215 excellent in shock absorbing function produced using synthetic rubber having excellent weatherability is disposed between the lower end sealing portions 145 positioned at the bottom surface side positioned at a side opposite to the electrode terminal portion 230 side of the stacked unit batteries 100.

The stacked body movement suppressing members 215 are connected to each other at their one end by the second reinforcing member 203. The second reinforcing member 203 is fixed to the fixing tape 210b by the protective tape 212b. This prevents displacement of the stacked body movement suppressing members 215 to make it possible to reliably prevent movement of the unit batteries 100.

Further, the stacked body movement suppressing members 215 also perform function of pressing the lower end sealing portion 145 of each unit battery 100, so that even when the lower end sealing portion 145 is made shorter in length than other sealing portions, sufficient strength can be ensured, thereby increasing long-term reliability of the battery pack. Further, in the battery pack according to the present invention, it is possible to maintain the rectangular structure over a long period.

INDUSTRIAL APPLICABILITY

In the battery pack according to the present invention, the mounted unit batteries are not moved by shock or the like and, thus, even when the battery pack of the invention is used in application, such as an electric automobile or an electric bicycle, where vibration or shock is applied, stable operation can be achieved over a long period of time.

REFERENCE SIGNS LIST

100: Unit battery
200: Battery stacked body
113a, 113b: Side end portion
201: First reinforcing member
210a, 210b: Fixing tape
201: Battery stacked body
205: Cushioning member
230: Electrode terminal portion
231: Signal line
233, 233a, 233b: Lead wire
215: Stacked body movement suppressing member
203: Second reinforcing member
212a, 212b: End surface fixing tape
110: Battery main body
111: Upper end portion
120: Positive electrode lead-out tab
130: Negative electrode lead-out tab
112: Lower end portion
113a, 113b: Side end portion
141: Upper end heat sealing portion
143a, 143b: Two side end heat sealing portions
145: Lower end heat sealing portion

The invention claimed is:

1. A battery pack comprising:
a unit battery comprising a battery element in which positive and negative electrodes are stacked via separators, said battery element being encased in a casing film comprising opposing synthetic resin layers formed on an inner surface of the casing film, and heat-sealed at peripheral sides of the battery element, the heat-sealed portion having two or more sealed widths, wherein a positive electrode tab terminal and a negative electrode tab terminal are led out from one of the heat scaled portions;
a lithium ion secondary battery stacked body comprising a plurality of unit batteries wound with a fixing tape therearound, wherein the positive electrode tab terminals and the negative electrode tab terminals of the plurality of unit batteries have electrode terminal portions arranged in the same direction, wherein
a sealing surface of the sealed portion contained within said unit battery is substantially parallel to a unit battery stacking surface, and an end surface of the sealed portion is brought into contact with the fixing tape;
a first reinforcing member is disposed on an outermost layer of the battery stacked body and fixed to the battery stacked body, together with the unit batteries by the fixing tape, wherein a width of the first reinforcing member is equal to a width of a side end portion of the unit batteries;
a second reinforcing member adhered to the fixing tape by a protection tape; and
a stacked body movement suppressing member is disposed between heat-scaled portions of a plurality of the stacked unit batteries in the battery stacked body, the heat-sealed portions positioned on an opposite side of the electrode terminal portions, the stacked body movement suppressing member having one end connected to the second reinforcing member.

2. The battery pack according to claim 1, wherein positive and negative electrode terminals are led out from a side having the largest sealing width.

* * * * *